(12) United States Patent
Rao

(10) Patent No.: US 11,269,379 B2
(45) Date of Patent: Mar. 8, 2022

(54) DISPLAY SCREEN ASSEMBLY AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Ping Rao, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 67 days.

(21) Appl. No.: 16/968,892

(22) PCT Filed: Jul. 29, 2020

(86) PCT No.: PCT/CN2020/105451
§ 371 (c)(1),
(2) Date: Aug. 11, 2020

(65) Prior Publication Data
US 2022/0011820 A1 Jan. 13, 2022

(51) Int. Cl.
*G06F 1/16* (2006.01)
*H04M 1/02* (2006.01)
*G09F 9/30* (2006.01)

(52) U.S. Cl.
CPC ........ *G06F 1/1652* (2013.01); *H04M 1/0268* (2013.01); *G09F 9/301* (2013.01)

(58) Field of Classification Search
CPC combination set(s) only.
See application file for complete search history.

(56) References Cited

U.S. PATENT DOCUMENTS

| 8,804,317 | B2* | 8/2014 | Watanabe | G06F 1/1616 |
| | | | | 361/679.06 |
| 9,075,258 | B2* | 7/2015 | Watanabe | G02F 1/13336 |
| 9,600,035 | B2* | 3/2017 | Park | G06F 1/1681 |
| 9,989,790 | B2* | 6/2018 | Yang | G02F 1/133305 |

(Continued)

FOREIGN PATENT DOCUMENTS

| CN | 110728907 A | 1/2020 |
| CN | 111063262 A | 4/2020 |

(Continued)

*Primary Examiner* — Lisa Lea-Edmonds
(74) *Attorney, Agent, or Firm* — The Roy Gross Law Firm, LLC; Roy Gross

(57) ABSTRACT

A display screen assembly and a display device are disclosed. The display screen assembly includes a cover and a flexible display panel disposed in a stack arrangement. The cover is configured with peripheral edges bending toward the flexible display panel. The flexible display panel includes a first plane, a curved surface disposed around the first plane, and a second plane adjoining the curved surface. The curved surface includes a first curved surface and a second curved surface. The first curved surface bends and extends from peripheral edges of the first plane in a direction where the peripheral edges of the cover bend, and the second curved surface bends and extends from peripheral edges of the first curved surface with a predetermined radius in a direction toward the first plane.

20 Claims, 4 Drawing Sheets

(56) References Cited

U.S. PATENT DOCUMENTS

| | | | |
|---|---|---|---|
| 10,133,303 B2* | 11/2018 | Park | G06F 1/1681 |
| 10,490,759 B2 | 11/2019 | Choi et al. | |
| 10,623,537 B2* | 4/2020 | Lee | G06F 1/1652 |
| 10,651,247 B2* | 5/2020 | Yan | H01L 51/0097 |
| 10,908,651 B2* | 2/2021 | Honma | G06F 1/203 |
| 11,059,277 B2* | 7/2021 | Gao | H01L 51/5246 |
| 11,114,651 B2* | 9/2021 | Jiang | H01L 51/56 |
| 11,126,046 B2* | 9/2021 | Zheng | G02F 1/13458 |
| 11,126,226 B2* | 9/2021 | Lu | G01B 7/16 |
| 11,175,693 B2* | 11/2021 | Song | G06F 1/1652 |
| 2019/0204867 A1* | 7/2019 | Song | G06F 1/1616 |
| 2019/0229171 A1 | 7/2019 | Nishinohara | |
| 2020/0028124 A1* | 1/2020 | Jiang | H01L 51/5237 |
| 2020/0169623 A1 | 5/2020 | Shin | |
| 2020/0209922 A1* | 7/2020 | Lu | G01B 7/30 |
| 2020/0253035 A1 | 8/2020 | Kwon et al. | |
| 2021/0200270 A1* | 7/2021 | Shen | G06F 1/1652 |
| 2021/0280093 A1* | 9/2021 | Zhu | G06F 3/0412 |

FOREIGN PATENT DOCUMENTS

| | | |
|---|---|---|
| CN | 111128020 A | 5/2020 |
| CN | 111211146 A | 5/2020 |
| CN | 111292622 A | 6/2020 |
| CN | 210836910 U | 6/2020 |

* cited by examiner

110

DISPLAY SCREEN ASSEMBLY AND DISPLAY DEVICE

BACKGROUND OF INVENTION

1. Field of Invention

The present invention relates to a technical field of displays, and particularly to, a display screen assembly and a display device.

2. Related Art

With ever-changing display technologies, flexible display technologies have become the key to development of display industries, and flexible display panels have also got full attention and have been increasingly widely used in various fields, such as terminal fields.

Currently, most common terminal screens on the market are generally provided with double-sided curved 3D cover glasses, that is, left and right sides of the screens are curved. In order to match curvature of screens, display panels are usually bent 180 degrees with a certain radius in conventional manufacturing processes of display panels. However, conventional display panels fail to keep up with changes brought about by the advent of four-sided curved cover glasses, causing great difficulties to the mass production of terminals.

SUMMARY OF INVENTION

An object of the present invention is to provide a display screen assembly and a display device to overcome a technical problem that conventional display panels cannot be used for four-sided curved screens.

To achieve the above-mentioned object, the present application provides a display screen assembly, comprising a cover and a flexible display panel disposed in a stack arrangement. The cover is configured with peripheral edges bending toward the flexible display panel, and the flexible display panel comprises a first plane, a curved surface disposed around the first plane, and a second plane adjoining the curved surface. The curved surface comprises a first curved surface and a second curved surface, the first curved surface bends and extends from peripheral edges of the first plane in a direction where the peripheral edges of the cover bend, and the second curved surface bends and extends from peripheral edges of the first curved surface with a predetermined radius in a direction toward the first plane.

In the display screen assembly of the present invention, a tangent is defined at a juncture of the first curved surface and the second curved surface and is perpendicular to the second plane.

In the display screen assembly of the present invention, the predetermined radius is 0.35 millimeters (mm).

In the display screen assembly of the present invention, a photosensitive adhesive layer is attached to a side of the second curved surface adjacent to the cover to protect the second curved surface.

In the display screen assembly of the present invention, an area of the photosensitive adhesive layer attached to the second curved surface is greater than an area of the second curved surface.

In the display screen assembly of the present invention, the display screen assembly further comprises a second support plate disposed on a side of the second plane adjacent to the cover.

In the display screen assembly of the present invention, a pad is sandwiched between the first support plate and the second support plate.

In the display screen assembly of the present invention, a gap is formed between the pad and the second curved surface.

In the display screen assembly of the present invention, a heat dissipation plate is disposed between the pad and the first support plate.

In the display screen assembly of the present invention, a polarizer is disposed between the cover, the first plane, and the curved surface, and the polarizer has a profile matching the first plane and the curved surface.

In the display screen assembly of the present invention, an optical adhesive is disposed on a surface of the polarizer adjacent to the cover.

The present application further provides a display screen assembly, comprising a cover and a flexible display panel disposed in a stack arrangement; wherein the cover is configured with peripheral edges bending toward the flexible display panel, and the flexible display panel comprises a first plane, a curved surface disposed around the first plane, and a second plane adjoining the curved surface; wherein the curved surface comprises a first curved surface and a second curved surface, the first curved surface bends and extends from peripheral edges of the first plane in a direction where the peripheral edges of the cover bend, and the second curved surface bends and extends from peripheral edges of the first curved surface with a predetermined radius in a direction toward the first plane; wherein a photosensitive adhesive layer is attached to a side of the second curved surface adjacent to the cover to protect the second curved surface, and a first support plate is disposed on a surface of the flexible display panel away from the cover and has a profile matching the first plane and the first curved surface.

In the display screen assembly of the present invention, the display screen assembly further comprises a second support plate disposed on a side of the second plane adjacent to the cover.

In the display screen assembly of the present invention, a pad is sandwiched between the first support plate and the second support plate.

In the display screen assembly of the present invention, a gap is formed between the pad and the second curved surface.

In the display screen assembly of the present invention, a heat dissipation plate is disposed between the pad and the first support plate.

In the display screen assembly of the present invention, a polarizer is disposed between the cover, the first plane, and the curved surface, and the polarizer has a profile matching the first plane and the curved surface.

In the display screen assembly of the present invention, an optical adhesive is disposed on a surface of the polarizer adjacent to the cover.

The present application further a display device, comprising any one of the display screen assembly as described above.

The present application has advantageous effects as follows: the present application provides a display screen assembly and a display device. The display screen assembly includes a cover and a flexible display panel disposed in a stack arrangement. The cover is configured with peripheral edges bending toward the flexible display panel, and the flexible display panel includes a first plane, a curved surface disposed around the first plane, and a second plane adjoining the curved surface, wherein the curved surface includes a first curved surface and a second curved surface. By enabling the first curved surface to bend and extend from peripheral edges of the first in a direction where the peripheral edges of the cover bend, and the second curved surface to bend and extend from peripheral edges of the first curved surface with a predetermined radius in a direction toward the first plane, the display screen assembly achieves a great match of the flexible display panel with the four-sided curved cover, thereby overcoming a technical problem that conventional display panels cannot be used for four-sided curved screens.

BRIEF DESCRIPTION OF DRAWINGS

The following detailed description of specific implementations of the present application in conjunction with the accompanying drawings will make the technical solutions and other beneficial effects of the present application obvious.

DESCRIPTION OF PREFERRED EMBODIMENTS

Figure 1:
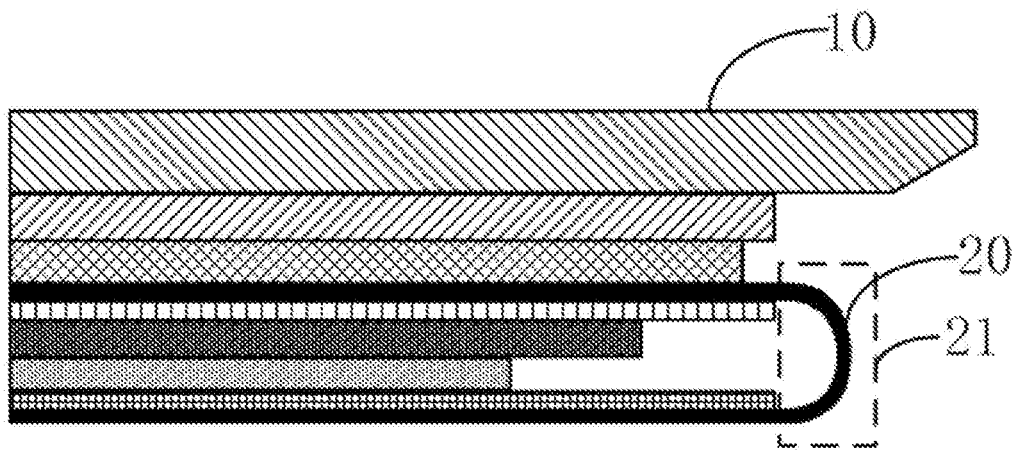
FIG. 1 is a schematic structural view of a conventional display screen assembly.

The technical solutions in the embodiments of the present application will be clearly and completely described below in conjunction with the drawings in the embodiments of the present application. Obviously, the described embodiments are only a part of the embodiments of the present application, rather than all the embodiments. To simplify the disclosure of the present invention, the components and configuration of specific examples are described hereinafter. Of course, they are only illustrative, and are not intended to limit the present invention. Further, the present disclosure may repeat reference numerals in different embodiments and/or the reference letters. This repetition is for the purpose of simplicity and clarity, and does not indicate a relationship between the various embodiments and/or set in question. Further, the present invention provides various specific examples of materials and processes, but one of ordinary skill in the art may be appreciated that other processes and applications and/or other materials.

In the description of the present invention, it is to be understood that the term "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicates orientation or the orientation or positional relationship based on the positional relationship shown in the drawings, for convenience of description only and the present invention is to simplify the description, but does not indicate or imply that the device or element referred to must have a particular orientation in a particular orientation construction and operation, and therefore not be construed as limiting the present invention. Moreover, the terms "first" and "second" and the like are used for descriptive purposes only and are not to be construed as indicating or implying relative importance. Thus, features defining "first" or "second" may include one or more of the described features either explicitly or implicitly. In the description of the present invention, the meaning of "a plurality" is two or more unless specifically and specifically defined otherwise.

In the present invention, unless otherwise explicitly specified or limited, the terms "mounted", "linked", "connected", and like terms are to be broadly understood. For example, it may be a fixed connection, a detachably connection, or an integrally connection, or may be a mechanical connection, electrically connection, or a directly connection. Alternatively, it can also be connected indirectly through intervening structures, or may be interaction between the two internal communicating elements or two elements. Those of ordinary skill in the art, to be understood that the specific meanings in the present invention in accordance with specific circumstances.

In the present invention, unless otherwise expressly specified or limited, the first feature being "on" or "lower" the second feature may include direct contact of the first and the second features and may also include that the first and the second features are not in direct contact, but in contact by the additional features therebetween. Also, the first feature being "on", "above", "upper" the second feature may include that the first feature is obliquely upward, directly above the second feature, or simply represent that a level of the first feature is higher than that of the second feature. The first feature being "beneath", "below" and "lower" the second feature may include that the first feature is obliquely downward and right below the second feature, or simply represent that a level of the first feature is less than that of the second feature.

Please refer to FIG. 1. FIG. 1 is a schematic structural view of a conventional display screen assembly. The conventional display screen assembly includes a cover 10 and a flexible display panel 20. At present, covers used by current screen assemblies on the market are all conventional 3D CG (cover glass), that is, both sides of the cover 10 is curved. In manufacturing processes of the flexible display panel 20, the flexible display panel 20 is generally bent 180 degrees with a certain radius. As shown in FIG. 1, a bent portion 21 of the flexible display panel 20 is U-shaped.

However, with ever-changing development of display technologies, more and more four-sided curved screens have appeared on the market. Covers adapted to four-sided curved screens are different from traditional 3D cover glasses because peripheries of the covers used for the four-sided curved screes are curved in shape. As a result, a curved profile of current flexible display panels cannot be used for covers of the four-sided curved screens, so the problem must be addressed.

Figure 2:
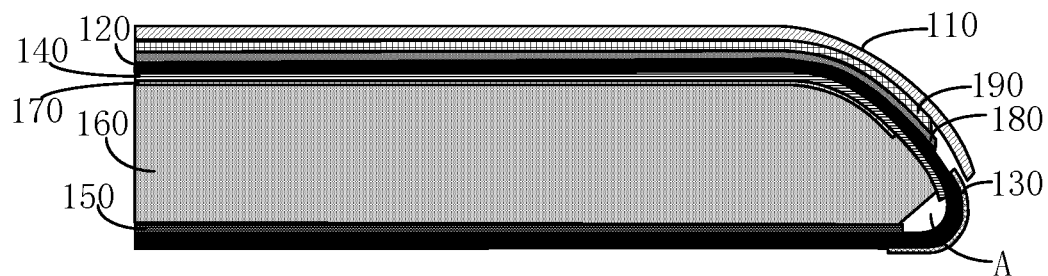
FIG. 2 is a schematic structural view of a display screen assembly in accordance with an embodiment of the present application.
Figure 3:
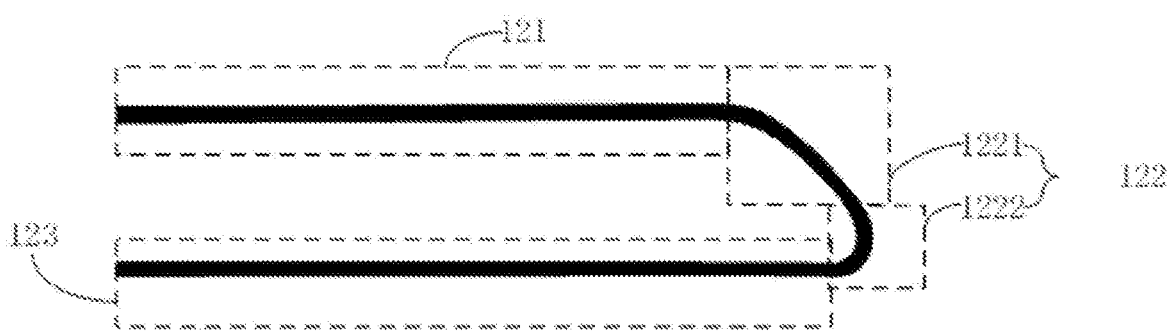
FIG. 3 is a schematic structural view of a flexible display panel in accordance with an embodiment of the present application.

Please refer to FIGS. 2 and 3. FIG. 2 is a schematic structural view of a display screen assembly in accordance with an embodiment of the present application. FIG. 3 is a schematic structural view of a flexible display panel in accordance with an embodiment of the present application. A display screen assembly 100 includes a cover 110 and a flexible display panel 120 disposed in a stack arrangement. The cover 110 is configured with peripheral edges bending toward the flexible display panel 120. As dashed boxes shown in FIG. 3, the flexible display panel 120 includes a first plane 121, a curved surface 122 disposed around the first plane 121, and a second plane 123 adjoining the curved surface 122. Specifically, the curved surface 122 includes a first curved surface 1221 and a second curved surface 1222.

The first curved surface 1221 bends and extends from peripheral edges of the first plane 121 in a direction where the peripheral edges of the cover 110 bend, and the second curved surface 1222 bends and extends from peripheral edges of the first curved surface 1221 with a predetermined radius in a direction toward the first plane 1221.

Figure 4:
FIG. 4 is a schematic structural side view of a cover in accordance with an embodiment of the present application.

Please refer to FIG. 4. FIG. 4 is a schematic structural side view of the cover 110 provided by an embodiment of the present application. As shown in FIG. 4, upper, lower, left, and right edges of the cover 110 are curved in shape. Specifically, the cover 110 may be a glass cover. It should be noted that it is ideal that the glass cover is as thin as possible, but if it is too thin, stress generated by bending of the glass cover will increase. If the glass cover is too thick, it will cause an increase in weight or a decrease in visibility. Therefore, an upper limit of a thickness of the glass cover is preferably 0.8 millimeters (mm), and a lower limit is preferably 0.5 mm.

Figure 5:
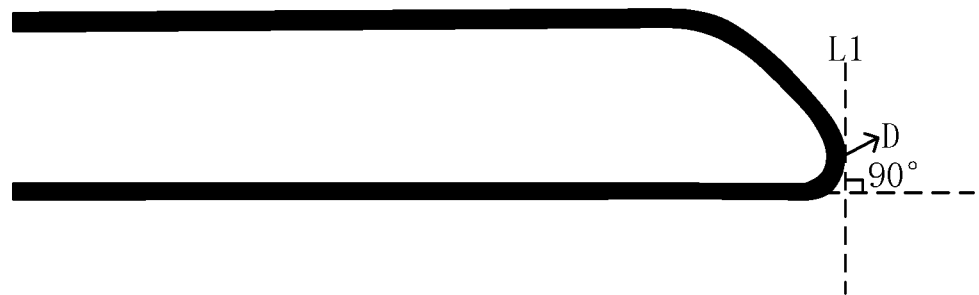
FIG. 5 is a schematic view showing a bending angel of a flexible display panel in accordance with an embodiment of the present application.

Specifically, the predetermined radius is 0.35 mm. Please refer to FIG. 5. FIG. 5 is a schematic view showing a bending angel of a flexible display panel in accordance with an embodiment of the present application. As shown in FIG. 5, a tangent L1 of a juncture D of the first curved surface 1221 and the second curved surface 1222 is perpendicular to the second plane 123. Specifically, since a bending angle of the second curved surface 1222 is far less than 180 degrees, stress on the second curved surface 1222 is far less than stress on a conventional flexible display panel at a bending position, thereby increasing a lifespan of the flexible display panel 120.

Specifically, a base material of the flexible display panel 120 may be plastic, polyester film or film. Since an upper electrode or a thin-film transistor (TFT) material needs to be sputtered on the flexible display panel 120, the flexible display panel 120 is generally made of a high temperature resistant polymer, and must be a high temperature resistant polyimide (PI) material.

In this embodiment, a photosensitive adhesive layer 130 is attached to a side of the second curved surface 1222 adjacent to the cover 110 to protect the second curved surface 1222. Preferably, an area of the photosensitive adhesive layer 130 attached to the second curved surface 1222 is greater than an area of the second curved surface 1222. That is, the photosensitive adhesive layer 130 may be partially attached to the first curved surface 1221 and/or the second plane 123. At the same time, thickness of part of the photosensitive adhesive layer 130 attached to the first curved surface 1221 and the second plane 123 can be adequately reduced.

Specifically, during a curing process of the photosensitive adhesive layer 130, an adhesive at peripheral edges will be spread naturally by flow of the adhesive, resulting in an uncontrollable slope, so that thickness of the photosensitive adhesive layer 130 at the peripheral edges is relatively thin. When the second curved surface 1222 is bent, a portion thereof easily to be bent is prone to be under stress, which tends to cause a sharp bending on an area where a peripheral edge of the second curved surface 1222 covers a thinner part of the photosensitive adhesive layer 130, giving rise to break of lines. Therefore, an adhesion area of the photosensitive adhesive layer 130 can be appropriately increased to ensure the quality of the flexible display panel 120. Also, in order to save costs and minimize thickness of the display screen assembly 100, thickness of part of the photosensitive adhesive layer 130 attached to the first curved surface 1221 and the second plane 123 may be adequately reduced.

In this embodiment, the display screen assembly 100 further includes a first support plate 140 disposed on a surface of the flexible display panel 120 away from the cover 110 and having a profile matching the first plane 121 and the first curved surface 1221. Preferably, the second curved surface 1222 may be bent along ends of the first support plate 140.

In this embodiment, the display screen assembly 100 further includes a second support plate 150 disposed on a side of the second plane 123 adjacent to the cover 110.

Specifically, materials of the first support plate 140 and the second support plate 150 include, but are not limited to, polyethylene terephthalate (PET), polyethylene (PE), and a thickness of each of the first support plate 140 and the second support plate 150 is between 0.06 mm and 0.2 mm.

Specifically, the first support plate 140 and the second support plate 150 may be attached to the flexible display panel 120 by an adhesive (not shown). It should be understood that the adhesive refers to a material that can bond two objects, which can have characteristics of being cured by heat or curing by light. Optionally, the first support plate 140 and the second support plate 150 can also be supported by a polymer material cured by light, such as UV glue, so that process steps of applying the adhesive can be saved.

In this embodiment, a pad 160 is sandwiched between the first support plate 140 and the second support plate 150.

Specifically, a material of the backing plate 160 is mainly a stiffener material, such as metal sheet, plastic sheet, resin film, and epoxy glass substrate, etc. for reinforcing part of the flexible display panel 120, and provides support and fixing functions. Generally, a thickness of the plate 160 is 0.1 mm-0.6 mm.

Particularly, a gap is formed between the pad 160 and the second curved surface 1222. Since the second curved surface 1222 is relatively fragile, there is a certain gap between the pad 160 and the second curved surface 1222. As shown by an area A in FIG. 2, the pad 160 and the second curved surface 1222 are completely not in contact with each other by the gap, so that damage to the second curved surface 1222 caused by the pad 160 can be prevented.

In this embodiment, a heat dissipation plate 170 is disposed between the pad 160 and the first support plate 140.

Specifically, the heat dissipation plate 170 may be made of Super Clean Foam (SCF) heat dissipation material. SCF can achieve buffering and shading, and most importantly, it can realize heat dissipation. Since SCF is a composite material combining functions such as shading, heat dissipation, buffering, electromagnetic shielding, etc., it not only reduces a bonding process in a factory process, but also helps reduce the thickness of the display screen assembly 100, wherein a conventional thickness of SCF is 0.2 mm.

In addition, A layer of adhesive material may be provided on surfaces of the heat dissipation plate 170, the first support plate 140, and the second support plate 150 in contact with the pad 160. An adverse effect on the display screen assembly 100 caused by shaking of the flexible display panel 120 can be prevented by bonding the heat dissipation plate 170, the first support plate 140, and the second support plate 150 to the pad 160. Specifically, the adhesive material can be one of epoxy resin glue (AD glue), conductive glue, or textured glue (EMBO glue), wherein a thickness of the adhesive material may be between 0.035 mm and 0.3 mm.

In this embodiment, a polarizer 180 is disposed between the cover 110, the first plane 121, and the curved surface 122. The polarizer 180 has a profile matches the first plane 121 and the curved surface 122.

Specifically, since the flexible display panel 120 itself is self-luminous, after an external light source impinges on a metal electrode of the flexible display panel 120, the light is reflected back to cause interference on a surface of the cover 110, thereby reducing the contrast. Therefore, the polarizer 180 is provided to block the reflection of external light to ensure that displaying of the screen assembly 100 maintains a high contrast ratio. In one embodiment, a thickness of the polarizer 180 may be between 0.06 mm and 0.18 mm.

In this embodiment, an optical adhesive 190 is disposed on a surface of the polarizer 180 adjacent to the cover 110.

Specifically, the optical adhesive 190 is a special adhesive used to bond transparent optical elements (such as lenses, etc.) and has characteristics of being colorless and transparent, light transmittance above 90%, good bonding strength, curable at room temperature or medium temperature, and small shrinkage after curing. Therefore, the optical adhesive 190 is very suitable as a bonding material for the polarizer 180 and the cover 110, wherein a thickness of the optical adhesive 190 may be 0.1 mm-0.175 mm.

The present application further provides a display device including the display screen assembly described in any of the above embodiments. For details, please refer to the above description, which will not be repeated here.

In this embodiment, the display device can be applied to any product or component with a display function, such as mobile phones, displays, tablet computers, televisions, notebook computers, digital photo frames, navigators, and so on.

According to the above-mentioned embodiments, the present application provides a display screen assembly and a display device. The display screen assembly 100 includes a cover 110 and a flexible display panel 120 disposed in a stack arrangement. The cover 110 is configured with peripheral edges bending toward the flexible display panel 120, and the flexible display panel 120 includes a first plane 121, a curved surface 122 disposed around the first plane 121, and a second plane 123 adjoining the curved surface, wherein the curved surface 122 includes a first curved surface 1211 and a second curved surface 1222. By enabling the first curved surface 1211 to bend and extend from peripheral edges of the first plane 121 in a direction where the peripheral edges of the cover 110 bend, and the second curved surface 1222 to bend and extend from peripheral edges of the first curved surface 1221 with a predetermined radius in a direction toward the first plane 121, the display screen assembly achieves a great match of the flexible display panel with the four-sided curved cover, thereby overcoming a technical problem that conventional display panels cannot be used for four-sided curved screens.

In the above-mentioned embodiments, the description of each embodiment has its own emphasis. Reference may be made to related descriptions of other embodiments for parts that are not described in detail in a certain embodiment.

The display screen assembly and display device provided by the embodiments of the present application are described above in detail. Specific examples are used in this article to illustrate the principles and implementation of the application. The description of the above examples is only used to help understand the technical solutions and core ideas of the application. Those of ordinary skill in the art should understand that they can still modify the technical solutions described in the foregoing embodiments, or make equivalent replacements to some of the technical features; and these modifications or replacements do not cause the essence of the corresponding technical solutions to deviate from the scope of the technical solutions of the embodiments of the present application.

What is claimed is:

1. A display screen assembly, comprising:
   a cover and a flexible display panel disposed in a stack arrangement;
   wherein the cover is configured with peripheral edges bending toward the flexible display panel, and the flexible display panel comprises a first plane, a curved surface disposed around the first plane, and a second plane adjoining the curved surface;
   wherein the curved surface comprises a first curved surface and a second curved surface, the first curved surface bends and extends from peripheral edges of the first plane in a direction where the peripheral edges of the cover bend, and the second curved surface bends and extends from peripheral edges of the first curved surface with a predetermined radius in a direction toward the first plane.

2. The display screen assembly of claim 1, wherein a tangent is defined at a juncture of the first curved surface and the second curved surface and is perpendicular to the second plane.

3. The display screen assembly of claim 1, wherein the predetermined radius is 0.35 millimeters (mm).

4. The display screen assembly of claim 1, wherein a photosensitive adhesive layer is attached to a side of the second curved surface adjacent to the cover to protect the second curved surface.

5. The display screen assembly of claim 4, wherein an area of the photosensitive adhesive layer attached to the second curved surface is greater than an area of the second curved surface.

6. The display screen assembly of claim 1, further comprising a first support plate disposed on a surface of the flexible display panel away from the cover and having a profile matching the first plane and the first curved surface.

7. The display screen assembly of claim 6, further comprising a second support plate disposed on a side of the second plane adjacent to the cover.

8. The display screen assembly of claim 7, wherein a pad is sandwiched between the first support plate and the second support plate.

9. The display screen assembly of claim 8, wherein a gap is formed between the pad and the second curved surface.

10. The display screen assembly of claim 8, wherein a heat dissipation plate is disposed between the pad and the first support plate.

11. The display screen assembly of claim 1, wherein a polarizer is disposed between the cover, the first plane, and the curved surface, and the polarizer has a profile matching the first plane and the curved surface.

12. The display screen assembly of claim 11, wherein an optical adhesive is disposed on a surface of the polarizer adjacent to the cover.

13. A display device, comprising the display screen assembly of claim 1.

14. A display screen assembly, comprising:
   a cover and a flexible display panel disposed in a stack arrangement;
   wherein the cover is configured with peripheral edges bending toward the flexible display panel, and the flexible display panel comprises a first plane, a curved surface disposed around the first plane, and a second plane adjoining the curved surface;
   wherein the curved surface comprises a first curved surface and a second curved surface, the first curved surface bends and extends from peripheral edges of the first plane in a direction where the peripheral edges of the cover bend, and the second curved surface bends and extends from peripheral edges of the first curved surface with a predetermined radius in a direction toward the first plane;

wherein a photosensitive adhesive layer is attached to a side of the second curved surface adjacent to the cover to protect the second curved surface, and a first support plate is disposed on a surface of the flexible display panel away from the cover and has a profile matching the first plane and the first curved surface.

15. The display screen assembly of claim 14, further comprising a second support plate disposed on a side of the second plane adjacent to the cover.

16. The display screen assembly of claim 15, wherein a pad is sandwiched between the first support plate and the second support plate.

17. The display screen assembly of claim 16, wherein a gap is formed between the pad and the second curved surface.

18. The display screen assembly of claim 16, wherein a heat dissipation plate is disposed between the pad and the first support plate.

19. The display screen assembly of claim 14, wherein a polarizer is disposed between the cover, the first plane, and the curved surface, and the polarizer has a profile matching the first plane and the curved surface.

20. The display screen assembly of claim 19, wherein an optical adhesive is disposed on a surface of the polarizer adjacent to the cover.

* * * * *